US007020459B2

(12) United States Patent
Nagayasu

(10) Patent No.: US 7,020,459 B2
(45) Date of Patent: Mar. 28, 2006

(54) RECEIVER

(75) Inventor: Takayuki Nagayasu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 469 days.

(21) Appl. No.: 10/182,391

(22) PCT Filed: Nov. 13, 2001

(86) PCT No.: PCT/JP01/09891

§ 371 (c)(1), (2), (4) Date: Jul. 30, 2002

(87) PCT Pub. No.: WO02/49303

PCT Pub. Date: Jun. 20, 2002

(65) Prior Publication Data

US 2003/0012310 A1 Jan. 16, 2003

(30) Foreign Application Priority Data

Dec. 13, 2000 (JP) ............................ 2000-378940

(51) Int. Cl.
*H04Q 7/20* (2006.01)

(52) U.S. Cl. ...................... 455/414; 455/412; 455/413; 455/432.2; 455/552.1; 455/553.1; 455/414.4; 455/517

(58) Field of Classification Search ................ 455/414, 455/69, 522, 455, 456.2, 414.4, 517, 412, 455/413, 552.1, 553.1, 432.2; 375/138, 139, 375/130, 150
See application file for complete search history.

(56) References Cited

U.S. PATENT DOCUMENTS

| | | | | |
|---|---|---|---|---|
| 6,039,250 | A * | 3/2000 | Ito et al. | 235/380 |
| 6,205,436 | B1 * | 3/2001 | Rosen | 705/65 |
| 6,490,270 | B1 * | 12/2002 | Krishnamoorthy et al. | 370/347 |
| 6,782,037 | B1 * | 8/2004 | Krishnamoorthy et al. | 375/138 |
| 6,845,237 | B1 * | 1/2005 | Moulsley | 455/422 |
| 2002/0028691 | A1 * | 3/2002 | Moulsley et al. | |

FOREIGN PATENT DOCUMENTS

| | | |
|---|---|---|
| EP | JP09-065386 | 3/1997 |
| JP | 6-343085 | 12/1994 |
| JP | 10-154193 | 6/1998 |
| JP | 11-143976 | 5/1999 |
| JP | 11-239192 | 8/1999 |
| JP | 2000-134271 | 5/2000 |
| JP | 2000-324081 | 11/2000 |
| JP | 2001-216400 | 8/2001 |

* cited by examiner

*Primary Examiner*—Allan Hoosain
(74) *Attorney, Agent, or Firm*—Oblon, Spivak, McClelland, Maier & Neustadt, P.C.

(57) ABSTRACT

A receiver receives a signal that has been encoded, interleaved, burst mapping processed, and modulated via a wireless channel. The receiver judges a modulation scheme for a burst based on a part of a known sequence in the burst; calculates a soft decision value for the burst based on the judged modulation scheme; and changes the soft decision value, if the judged modulation scheme is determined to be incorrect.

12 Claims, 8 Drawing Sheets

EXAMPLE OF SEPARATION OF CODED BLOCK AND BURST MAPPING

CONFIGURATION EXAMPLE OF BURST

ANOTHER CONFIGURATION EXAMPLE OF BURST

FIG.11

| SOFT DECISION VALUE | SOFT DECISION VALUE AFTER COMPRESSION | SOFT DECISION VALUE AFTER EXPANSION |
|---|---|---|
| 64～127 | 0 | 64 |
| 16～63 | 1 | 16 |
| 4～15 | 2 | 4 |
| 0～3 | 3 | 1 |
| -3～-1 | 4 | -1 |
| -15～-4 | 5 | -4 |
| -63～-16 | 6 | -16 |
| -128～-63 | 7 | -64 |

RECEIVER

TECHNICAL FIELD

The present invention relates to a receiver used in wireless communications such as in automobile phones, portable phones, cordless phones. More particularly, this invention relates to a receiver which judges the modulation scheme for each burst, and corrects a false soft decision value if there is a wrong judgement on the modulation scheme in part of the bursts within a coded block.

BACKGROUND ART

Hereinafter, a conventional receiver will be explained. Conventionally, when changing the modulation scheme in an on-going communication, the transmitter informs the receiver about the change in the modulation scheme and then changes the modulation scheme. However, in mobile communications there is a rougher change in the communication status so that the modulation scheme is changed without an advance notice to the receiver, and information transmission rate is flexibly changed, thereby increasing an average communication speed as well as enhancing confidentiality. Particularly in such a communication system as TDMA communications, where signals for reception are released in the form of bursts, the modulation scheme is judged from the data in the burst.

In the portable telephones that perform mobile communications, the transmitter performs an encoding process of combining the transmission data with specific codes for example. On the other hand, the receiver performs to the demodulated data a decoding process correspondingly to the encoding process performed, and corrects errors that have occurred during the transmission process. Through such an error correction, a certain level of communication quality is guaranteed.

It is well know that in the error correction process of demodulated data, a better quality of transmission can be achieved by soft decision decoding rather than by hard decision decoding. Here, the hard decision decoding yields a hard decision value, which is a result of determining what was in the transmission signal. The soft decision decoding yields a soft decision value, which is a combination of the hard decision value and reliability. For example, when the transmission side transmits a binary signal represented by 1 or −1, the hard decision value will be 1 or −1, whereas the soft decision value can be 0.9, −0.4 or the like. Here, the sign given to the soft decision value represents the hard decision value (i.e. the plus sign represents 1, and the minus sign represents −1), and the absolute value of the soft decision value represents the reliability, (Greater value indicates higher reliability).

According to the above mobile communications system, an interleaving process is performed to the encoded data on the transmission side. Therefore, even if errors are concentrated on a particular burst, these errors can be corrected as the errors can be dissipated in a deinterleaving process performed by the receiving device.

As described, in the mobile communications system such as PDC, IS-136, and GSM, the encoded data is transmitted in a plurality of bursts. Further, in the above system, the modulation scheme is changed for each coded block or every several blocks of the encoded data.

However, there is a problem in the conventional receiver in the mobile communications system. Specifically, when the modulation scheme is judged after receiving all of the bursts including the same coded blocks, all of the received signals in the bursts must be stored, which requires a large circuit size.

On the other hand, there is another problem when the modulation scheme is judged burst by burst and the judgment value obtained after the demodulation is stored. Specifically, the circuit size (memory capacity) can be smaller than in the above instance of storing all the received signals of the bursts, but due to an increased risk of performing a demodulation process in an incorrect mode, the received coded blocks sometimes cannot be decoded correctly due to this error.

It is an object of the present invention to provide a receiver capable of improving error correction ability while reducing the circuit size.

DISCLOSURE OF THE INVENTION

The receiver according to one aspect of the present invention receives a transmission signal as after an encoding process, an interleaving process, a burst mapping process, and a modulating process, from a transmission side via a wireless channel. The receiver comprises, a modulation scheme judging unit (which corresponds to the modulation scheme judging section 61 to be described later in the embodiments of the present invention) judging a modulation scheme for each burst based on a part of known sequence in a received signal, a soft decision unit (which corresponds to the soft decision section 62) giving a soft decision on the received signal, based on the judged modulation scheme, a soft decision value alteration controlling unit (which corresponds to the soft decision value alteration controller 63) providing control, if there is a wrong judgement in the judgement of a past modulation scheme made during a period in which there has been no change in the modulation scheme, for correcting a corresponding soft decision value, a soft decision value storing/correcting unit (which corresponds to the soft decision value storage 64) storing the soft decision value output by the soft decision unit, and correcting the soft decision value under the control of the soft decision value alteration controlling unit, a deinterleaving (which corresponds to the deinterleaver 16) performing a deinterleaving process to the stored soft decision value, and a decoding unit (which corresponds to the decoder 17) decoding the soft decision value as after the deinterleaving process.

The receiver according to another aspect of the present invention receives a transmission signal as after an encoding process, an interleaving process, a burst mapping process, and a modulating process, from a transmission side via a wireless channel. The receiver comprises, a modulation scheme judging unit judging a modulation scheme for each burst based on a part of known sequence in a received signal, a soft decision unit giving a soft decision on the received signal, based on the judged modulation scheme, a soft decision compressed-value alteration controlling unit (which corresponds to the soft decision value alteration controller 63) providing control, if there is a wrong judgement in the judgement of a past modulation scheme made during a period in which there has been no change in the modulation scheme, for correcting a corresponding soft decision compressed-value, a soft decision value compressing unit (which corresponds to the soft decision value compressor 71) compressing the number of bits of the soft decision value output by the soft decision unit, a soft decision compressed-value storing/correcting unit (which corresponds to the soft decision value storage 72) storing the soft decision compressed-value, and correcting the soft decision compressed-value under the control of the soft decision compressed-value alteration controlling unit, a deinterleaving unit performing a deinterleaving process to the stored soft decision compressed-value, a soft decision compressed-value expanding unit (which corresponds to the soft decision value expander 73) expanding the soft decision compressed-value as after the deinterleaving process to give a soft decision value, and a decoding unit decoding the soft decision value as after the expansion.

Moreover, the modulation scheme judging unit comprises, a plurality of correlation power calculating units (which correspond to the correlation power calculator 83) each calculating a correlation power between a part of known sequence in the received signal and a known sequence corresponding to a plurality of modulation schemes potentially used by a transmitter of the received signal, an accumulating unit (which corresponds to the accumulator 84) configured such as to correspond individually to each of the correlation power calculating unit for accumulation of the correlation powers and output of a result of the accumulation as a reliability for the corresponding modulation schemes, and a judging unit (which corresponds to the judging section 82) comparing the reliabilities corresponding to respective modulation schemes and selecting the most reliable modulation scheme as the modulation scheme of the received signal.

Furthermore, the modulation scheme judging unit comprises, a plurality of correlation power calculating units (which corresponds to the correlation power calculator 92) each calculating, at a different timing, a correlation power between a part of known sequence in the received signal and a known sequence corresponding to a plurality of modulation schemes potentially used by a transmitter of the received signal, a maximum value selecting unit (which corresponds to the maximum value selector 93) configured such as to correspond individually to the correlation power calculating unit, for selection as a formal correlation power of a maximum value from the obtained correlation powers, an accumulating unit configured such as to correspond individually to each of the maximum value selecting units for accumulation of the correlation power and output of a result of the accumulation as a reliability for the corresponding modulation schemes, and a judging unit comparing the reliabilities corresponding to respective modulation schemes and selecting the most reliable modulation scheme as the modulation scheme of the received signal.

Moreover, the modulation scheme judging unit further comprises a reverse rotation unit (which corresponds to the phase reverse-rotator 102) provided ahead of a plurality of correlation power calculating units, for rotation in reverse of a phase of the received signal by an amount of rotation corresponding to a relevant one of the modulation schemes.

Furthermore, the modulation scheme judging unit (which corresponds to the modulation scheme judging section 111) judges the modulation scheme for each burst based on a part of known sequence in a plurality of lines of the received signals, and the soft decision unit (which corresponds to the soft decision section 112) calculates the soft decision value based on the judged modulation scheme and the lines of the received signals.

Furthermore, the modulation scheme judging unit comprises, a plurality of correlation power calculating units (which correspond to the correlation power calculators 122*a* and 122*b*) calculating, for each of the modulation schemes potentially used by a transmitter of the received signal, a correlation power between apart of known sequence in one of the plural lines of the received signals and a known sequence corresponding to a specific modulation scheme, a correlation power combining unit (which corresponds to the adder 123) calculating for each of the modulation schemes a sum of correlation powers of the plural lines, an accumulating unit configured such as to correspond individually to each of the correlation power combining units for accumulation of the sums of correlation power and output of a result of the accumulation as a reliability for the corresponding modulation schemes, and a judging unit comparing the reliabilities corresponding to respective modulation scheme and selecting the most reliable modulation scheme as the modulation scheme of the received signal.

Moreover, the modulation scheme judging unit comprises, a plurality of correlation power calculating units (which correspond to the correlation power calculators 132*a* and 132*b*) calculating, for each of the modulation schemes potentially used by a transmitter of the received signal and at a different timing, a correlation power between a part of known sequence in one of the plural lines of the received signals and a known sequence corresponding to a specific modulation scheme, a correlation power combining unit (which corresponds to the adder 133) calculating for each of the modulation schemes a sum of correlation powers of the plural lines, a maximum value selecting unit configured such as to corresponding individually to the correlation power combining units for selection, as a formal correlation power, of a maximum value from the obtained sums of the correlation powers, an accumulating unit corresponding individually to the maximum value selecting units for accumulation of the correlation powers and output of a result of the accumulation as a reliability for the corresponding modulation schemes, and a judging unit comparing the reliabilities corresponding to respective modulation schemes and selecting the most reliable modulation scheme as the judged modulation scheme of the received signal.

Furthermore, the modulation scheme judging unit comprises, a correlation power calculating unit calculating, for each of the modulation schemes potentially used by a transmitter of the received signal and at a different timing, a correlation power between a part of known sequence in one of the plural lines of the received signals and a known sequence corresponding to a specific modulation scheme, a maximum value selecting unit (which corresponds to the maximum value selectors 142*a* and 142*b*) selecting for each of the modulation schemes a maximum value from the correlation powers corresponding to one of the lines of the received signals, a correlation power combining unit (which corresponds to the adder 143) calculating for each of the modulation schemes a sum of correlation powers, an accumulating unit configured such as to correspond individually to each of the correlation power combining units, for accumulation of the correlation powers and output of a result of the accumulation as a reliability for the corresponding modulation schemes, and a judging unit comparing the reliabilities corresponding to respective modulation schemes and selecting the most reliable modulation scheme as the judged modulation scheme of the received signal.

BRIEF DESCRIPTION OF THE DRAWINGS

FIG. 11 is a chart which shows a compressing process and an expanding process performed at a soft decision value compressor.

BEST MODE FOR CARRYING OUT THE INVENTION

Embodiments of the receiver according to the present invention will be described in detail with reference to the accompanying drawings. It should be noted here that the present invention is not limited by these embodiments.

First Embodiment

Figure 1:
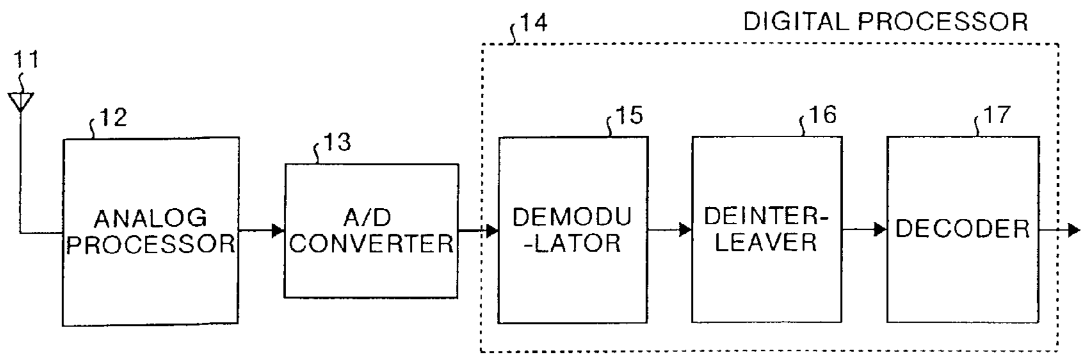
FIG. 1 is a diagram which shows a configuration of a receiver according to the present invention.

FIG. 1 is a diagram which shows a configuration of a receiver according to the present invention. In FIG. 1, the component indicated by the reference code 11 is an antenna, and 12 is an analog processor performing such processes as bandwidth limitation and down-conversion of the received wave. The component indicated by the reference code 13 is an A/D (analog/digital) converter which converts the received signal as after the down-conversion into a received signal of a digital form (hereinafter simply called received signal). The component indicated by the reference code 14 is a digital processor, 15 is a demodulator which demodulates the received signal by a soft decision process, 16 is a deinterleaver which rearranges the demodulated data back into the original sequence (i.e. this is a reverse process of the process performed in an interleaver 24 to be described later), and 17 is a decoder which performs error correction to the data as after the deinterleaving process. It should be noted here that FIG. 1 shows main functions of the receiver, and does not limit the present invention. Further, the digital processor 14 can be provided by F/W or, H/W, S/W.

Figure 2:
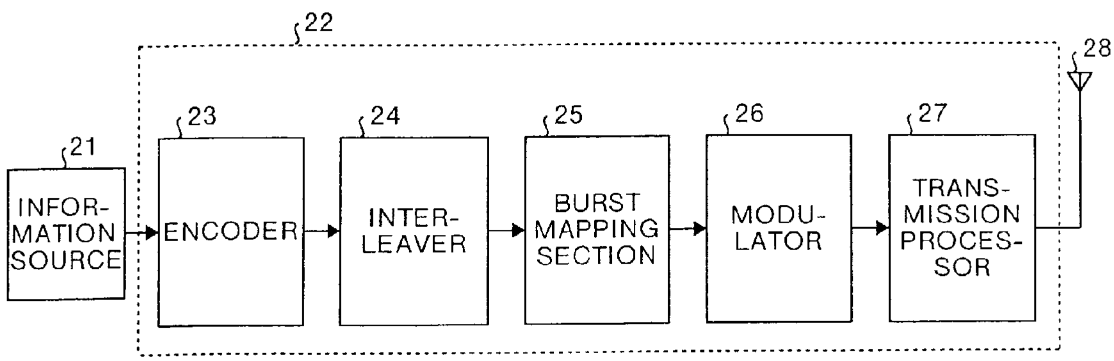
FIG. 2 is a diagram which shows a configuration of a transmitter.

Before describing an operation of the receiver which features the present invention, an operation of a device on the transmission side (transmitter) will be described. FIG. 2 shows a configuration of the transmitter. In FIG. 2, the component indicated by the reference code 22 is a transmitter, 23 is an encoder which performs an encoding process to data (e.g. encoded sound data and Internet data) received from an information source 21 for error correction. A component indicated by a reference code 24 is the interleaver which performs a rearrangement of the encoded data, 25 is a burst mapping section which places the encoded data as after the interleaving into bursts, 26 is a modulator which modulates the burst signal, 27 is a transmission processor which performs such processes as up-conversion to the signal as after the modulation, and 28 is an antenna. The transmission section 22 changes modulation schemes for each coded block depending on communications status. For the sake of convenience, an instance of switching between BPSK (Binary Phase Shift Keying) and QPSK (Quaternary Phase Shift Keying) in the transmission will be explained.

Figure 3:
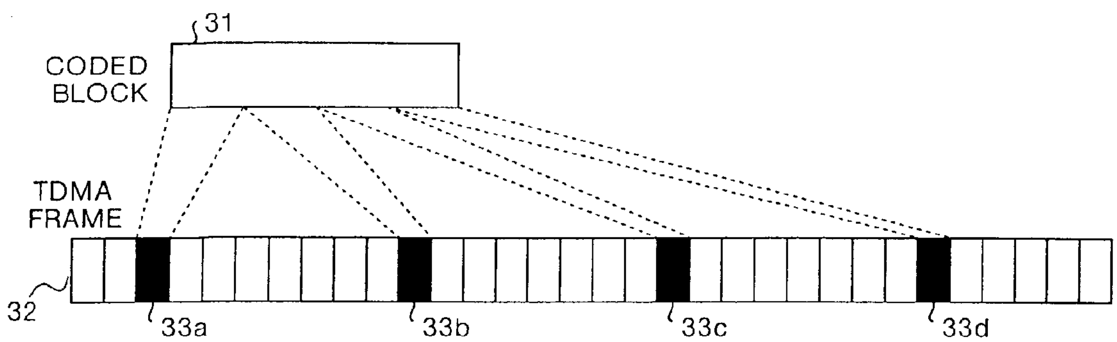
FIG. 3 is a diagram which shows a separation example of a coded block in a TDMA communication.

FIG. 3 is a diagram which shows a separation example of a coded block in a TDMA (Time Division Multiple access) communication. In the transmission section 22, first, the encoder 23 performs a predetermined encoding process to a transmission data. Next, the interleaver 24 performs an interleaving process to the coded block 31. Next, the burst mapping section 25 divides the coded block as after the interleaving process into four blocks, and places these four blocks into a TDMA frame 32, and more specifically into bursts 33*a*, 33*b*, 33*c*, 33*d* respectively. Thereafter, the bursts 33*a*, 33*b*, 33*c*, 33*d* are modulated in a same modulation scheme.

Figure 4:
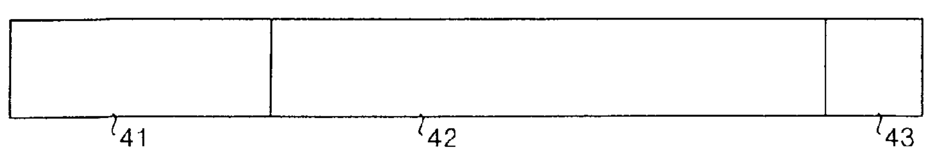
FIG. 4 is a diagram which shows a configuration example of a burst.

FIG. 4 is a diagram which shows a configuration of the burst. A known sequence 41 is a data known on the receiver side. Different sequences are allocated to different modulation schemes. An information sequence 42 is an encoded data divided as the above. A tail symbol 43 is a known data used for e.g. a soft decision process.

Figure 5:
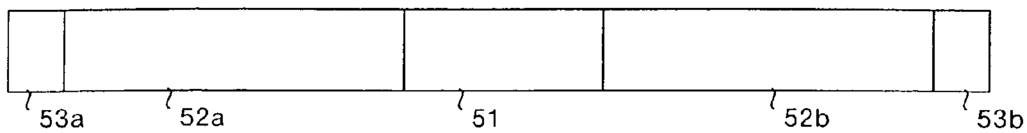
FIG. 5 is a diagram which shows an example configuration of the burst.

FIG. 5 is a diagram which shows another configuration of the burst, differing from the one in FIG. 4. A known sequence 51 is a data known on the receiver side. Different sequences are allocated to different modulation schemes. The encoded data is further divided into information sequence 52*a* and 52*b*. Tail symbols 53*a* and 53*b* are known data used for e.g. a soft decision process.

Figure 6:
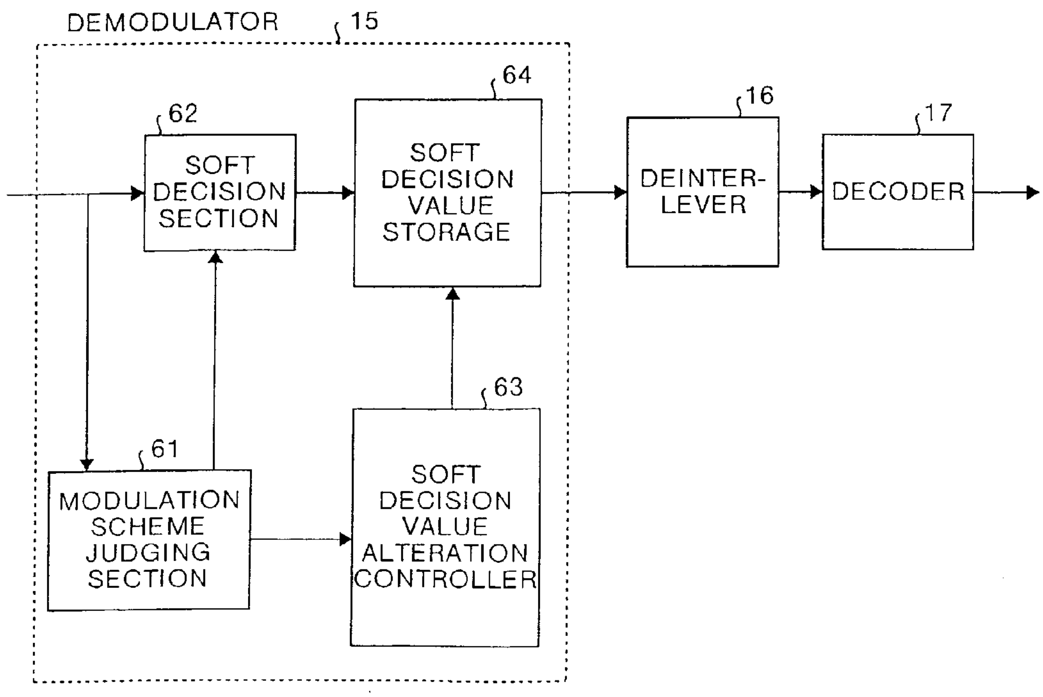
FIG. 6 is a diagram which shows a configuration of a demodulator according to a first embodiment.

The operation of the receiver will be described. FIG. 6 is a diagram which shows a configuration of the demodulator 15. In FIG. 6, the component indicated by the reference code 61 is a modulation scheme judging section, 62 is a soft decision section, 63 is a soft decision value alteration controller, and 64 is a soft decision value storage.

The modulation scheme judging section 61 judges the modulation scheme for each burst, based on correlation with the known sequence 41 contained in the received signal. The soft decision section 62 performs a soft decision in accordance with the modulation scheme so judged by the judgment. The soft decision section 62 uses a known technology such as synchronization detection. Further, if there is interference between codes due to multiple paths and the like, another known technology is used such as a soft decision output equalizer.

If a coded block includes a burst which has been given a different judgment from the judgement result of the modulation scheme given to the last burst (i.e. the burst 33*d* according to the example in FIG. 3), the soft decision value alteration controller 63 controls the soft decision value storage 64 to change the soft decision value for this particular burst.

The soft decision value storage 64 stores the soft decision value judged by the soft decision section 62, and makes correction on the soft decision value in accordance with the control from the soft decision value alteration controller 63. For example, assume there is a set of judgments given as below, (1) Modulation scheme judgement result for the burst 33*a*, BPSK (2) Modulation scheme judgement result for the burst 33*b*, QPSK
(3) Modulation scheme judgement result for the burst 33*c*, QPSK
(4) Modulation scheme judgement result for the burst 33*d*, QPSK Because the modulation scheme judgment result of the burst 33*a* differs from the modulation scheme judgment result of the burst 33*d*, the soft decision value for the burst 33*a* is replaced with that for QPSK. Specifically, the soft decision value as judged as BPSK is stored as one soft decision value per symbol, but for the soft decision value of QPSK, there are two soft decision values per symbol. Further, upon replacement, a value of the replacing soft decision value is set to "0" or another appropriate value which indicates low reliability.

Figure 7:
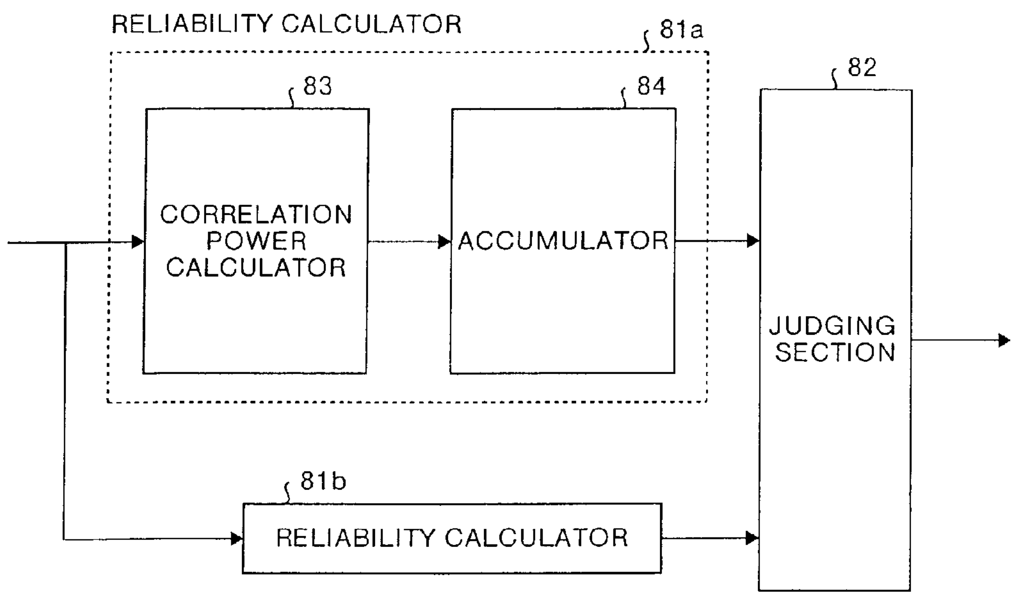
FIG. 7 is a diagram which shows a configuration example of a modulation scheme judging section.

FIG. 7 is a diagram which shows a configuration of the modulation scheme judging section 61. In FIG. 7, components indicated by reference codes 81*a* and 81*b* are reliability calculators. The component indicated by the reference code 82 is a judging section, 83 is a correlation power calculator, and 84 is an accumulator.

In the reliability calculator 81*a*, the correlation power calculator 83 calculates a correlation power between a portion corresponding to the known sequence 41 of the received signal and a known sequence corresponding to BPSK. The accumulator 84 accumulates the correlation power output for each burst, and outputs the result, as a reliability, to the judging section 82. It should be noted here that the correlation powers subject to the accumulation are those of the bursts in the same coded block. Specifically, when correlation powers corresponding to the bursts 33*a* through 33*d* are represented by Qa, Qb, Qc, Qd respectively, and the reliabilities by Ra, Rb, Rc, Rd, then they can be expressed as follows, $$Ra=Qa \quad (1)$$

$$Rb=Qa+Qb \quad (2)$$

$$Rc=Qa+Qb+Qc \quad (3)$$

$$Rd=Qa+Qb+Qc+Qd \quad (4)$$

The reliability becomes more accurate in the order of Ra through Rd. In the reliability calculator 81*b*, a known sequence for QPSK is used and reliability is calculated for each burst in the same way as the above.

The judging section 82 takes a modulation scheme corresponds to the higher reliability, as the judgment result of the modulation scheme. Specifically, if the reliability output from the reliability calculator 81*a* is greater, then the modulation scheme is judged as being BPSK, whereas if the reliability output from the reliability calculator 81*b* is greater, then the modulation scheme is judged as being QPSK.

Therefore, the deinterleaver 16 and the decoder 17 respectively perform a deinterleaving process and a decoding process correspondingly to the judgment result (modulation scheme) represented by the reliability Rd of the modulation scheme in the burst 33*d*. It should be noted here that in the accumulator 84, if one modulation scheme changes for a plurality of coded blocks, the accumulation may be made for such a period in which there is no change in the mode of modulation. This enables to further reduce misjudgments.

Figure 8:
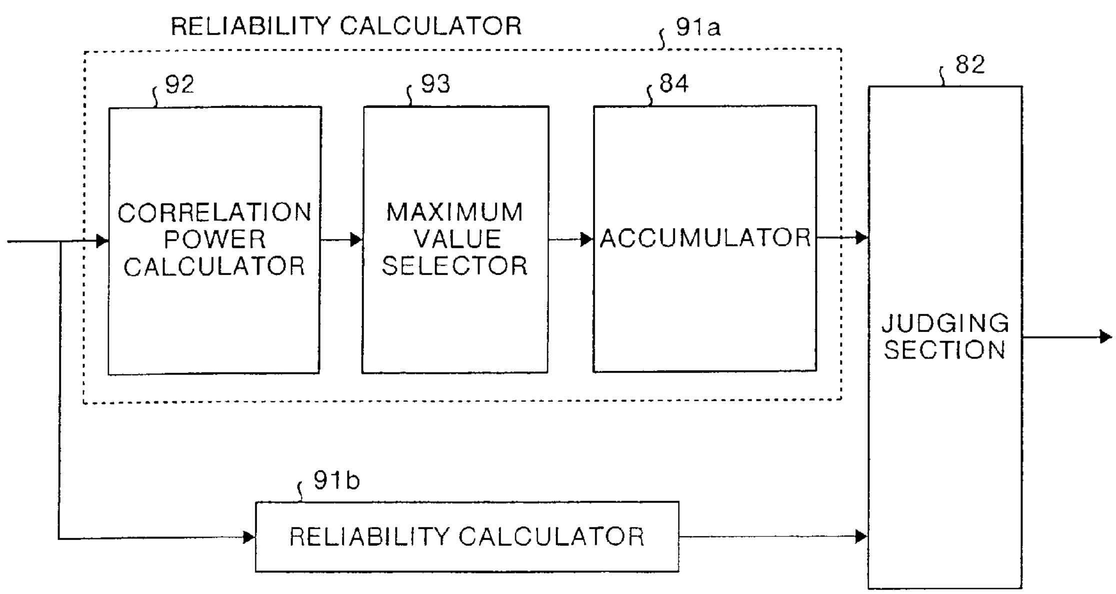
FIG. 8 is a diagram which shows a configuration example of the modulation scheme judging section.

FIG. 8 is a diagram which shows another configuration of the modulation scheme judging section 61 differing from the one in FIG. 7. In FIG. 8, components indicated by reference codes 91*a* and 91*b* are reliability calculators. The component indicated by the reference code 92 is a correlation power calculator, and 93 is a maximum value selector. Components identical with those in FIG. 7 are indicated by the same reference codes and will not be described here.

In the reliability calculator 91*a*, the correlation power calculator 92 calculates correlation power candidates Qa(k) between a portion corresponding to the known sequence 41 of the received signal and a known sequence I(i) corresponding to BPSK (I=0, . . . , N−1, k=−M, . . . , 0, . . . , M). The letter N represents a length of the known sequence, whereas M represents a single-side range of a detectable symbol timing.

$$Qa(k)=|\Sigma[r(i+k)\times \mathrm{CONJG}\{I(i)\}]|^2 \quad (5)$$

where, Σ calculates a total sum of i=0, . . . , N−1, and CONJG{a} represents a conjugate complex number of a complex number a.

The maximum value selector 93 selects the greatest one from the correlation power candidates output from the correlation power calculator 92, and outputs the value as the correlation power. The accumulator 84 calculates an accumulated value in the same way as in the example in FIG. 7, and outputs the result to the judging section 82. In the reliability calculator 91*b*, a known sequence for QPSK is used and reliability is calculated for each burst in the same way as in the reliability calculator 91*a*.

Therefore, according to this judging section 82, even if an accurate symbol position of the burst is not known or there is interference between codes due to multiple paths, it is still possible to judge the modulation scheme.

Figure 9:
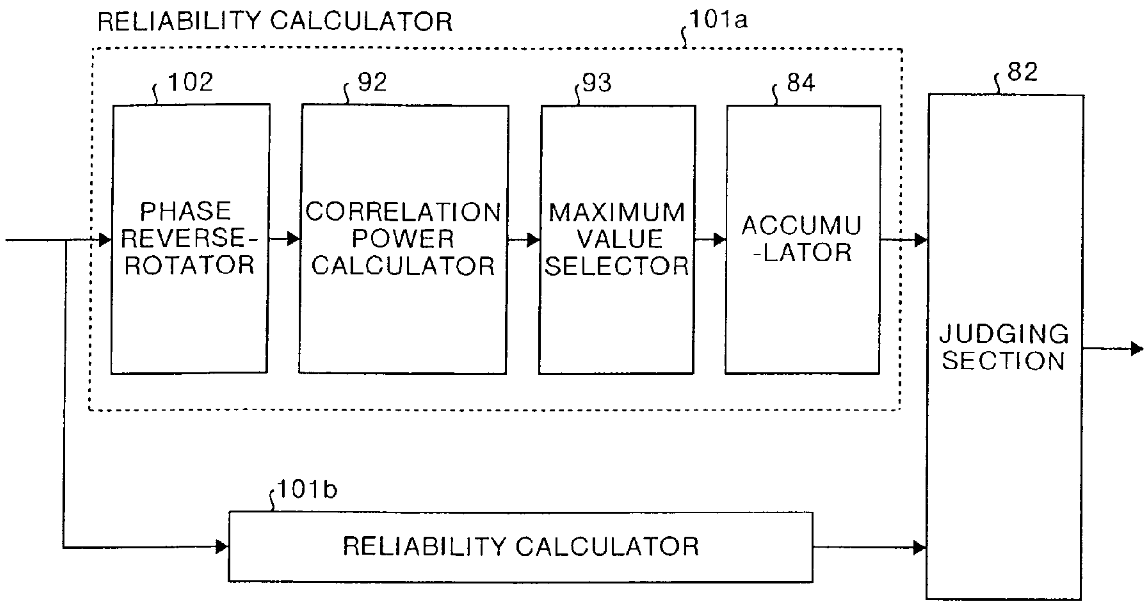
FIG. 9 is a diagram which shows a configuration example of the modulation scheme judging section.

FIG. 9 is a diagram which shows another configuration of the modulation scheme judging section 61 that is different from those shown in FIG. 7 and in FIG. 8. In FIG. 9, components indicated by reference codes 101*a* and 101*b* are reliability calculators. The component indicated by the reference code 102 is a phase reverse-rotator. An instance in which the modulation schemes are e.g. π/2 shift BPSK and π/4 shift QPSK, i.e. phase-shifted modulation schemes will be explained. Components identical with those in FIG. 7 or in FIG. 8 are indicated by the same reference codes and will not be described here.

In the reliability calculator 101*a*, the phase reverse-rotator 102 rotates in reverse the phase of the received signal by as much as π/2. The correlation power calculator 92, the maximum value selector 93 and the accumulator 84 calculate reliability for each burst in the same manner as described earlier. On the other hand, the reliability calculator 101*b* rotates in reverse the phase of the received signal by as much as π/4, and calculates reliability for each burst, by using a known sequence corresponding to QPSK.

Therefore, according to the judging section 82, even if the modulation schemes are a phase-shifted modulation schemes such as π/2 shift BPSK and π/4 shift QPSK, it is still possible to judge the modulation scheme.

As described, according to the first embodiment, a modulation scheme is judged for each burst, and the configuration is such that a soft decision is made on the basis of the judgment result. Therefore, it is no longer necessary to store the received signal in all of the bursts contained in the coded block. This enables to reduce memory size and to reduce circuit size of the entire receiver. Further, even if there is a misjudgment on the modulation scheme of a part of the bursts within the same coded block, the false soft decision value is now correctable. This enables to decode the coded block correctly at any time, making possible to achieve a higher quality in the communications than before.

Further, the configuration is such that reliabilities for the bursts included in the same coded block are accumulated, and the modulation scheme is found on the basis of this accumulated value. This enables to judge the modulation scheme more accurately than before. Further, it is configured such that a deinterleaver and a decoder perform a deinterleaving process and a decoding process respectively on the basis of the modulation scheme as judged as above. This enables to reduce probability of performing an unmatched deinterleaving process or an unmatched decoding process.

Further, it is configured such that correlation power candidates are calculated while shifting the timing of the received signal. From these correlation power candidates, a maximum value is selected, and the accumulated value for the selected result is taken as reliability. Therefore, even when the timing of the received signal is not known, and when there is interference between symbols due to multiple paths, it is still possible to judge the modulation scheme accurately.

Further, it is configured such that the correlation power is calculated after the phase of the received signal is rotated in reverse. Therefore, even if the modulation scheme includes phase shift, it is still possible to find the modulation scheme accurately. Further, since it is no longer necessary to include the rotation process by phase shifting, a configuration of the correlation power calculation section can be simplified.

It should be noted here that in the first embodiment, configurations and operations for when there are two modulation schemes are involved is explained. This is not limiting however. For example, even if three or more modulation schemes are involved, the same advantages as above can be obtained by providing three or more reliability calculators.

Second Embodiment

Figure 10:
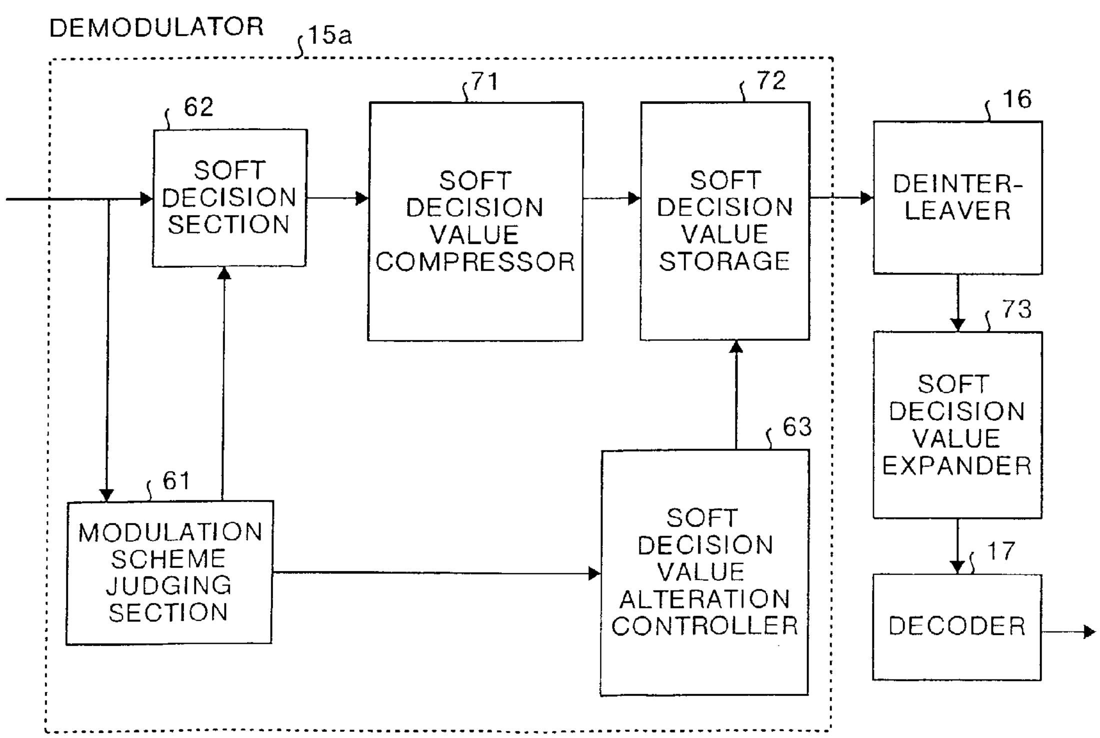
FIG. 10 is a diagram which shows a configuration of a receiver according to a second embodiment of the present invention.

FIG. 10 is a diagram which shows a configuration of a receiver according to a second embodiment of the present invention. In FIG. 10, the component indicated by the reference code 15*a* is a demodulator, 71 is a soft decision value compressor, 72 is a soft decision value storage, and 73 is a soft decision value expander. Components identical with those in the first embodiment are indicated by the same reference codes and will not be described here.

In the soft decision value compressor 71, the soft decision value output by the soft decision section 62 is compressed. FIG. 11 is a chart which shows a compressing process and an expanding process in the soft decision value compressor 71. For example, if the soft decision value is given in the eight-bit form ranging from −128 through 127, the soft decision value compressor 71 compresses a given soft decision value into a three-bit form ranging from 0 through 7.

The soft decision value storage 72 stores the soft decision value output by the soft decision value compressor 71, and makes correction on the soft decision value as after the compression received in the past, in accordance with the control from the soft decision value alteration controller 63. For example, assume there is a set of judgments as given below, (1) Modulation scheme judgement result for the burst 33*a*, BPSK
(2) Modulation scheme judgement result for the burst 33*b*, QPSK
(3) Modulation scheme judgement result for the burst 33, QPSK
(4) Modulation scheme judgement result for the burst 33*d*, QPSK Because the modulation scheme judgment result of the burst 33*a* differs from the modulation scheme judgment result of the burst 33*d*, the soft decision value for the burst 33*a* is replaced with that for QPSK, or specifically, replaced with the value “3” or “4”. It should be noted that these values indicate least reliable soft decision value as after the expansion.

The soft decision value expander 73 expands, as shown in FIG. 11, the soft decision value as after the compression and deinterleaving.

As described, according to the second embodiment, the same advantages as in the first embodiment are achieved. Further, since it is configured such that the soft decision value is stored in a compressed form, it becomes possible to reduce memory size further remarkably.

Third Embodiment

Figure 12:
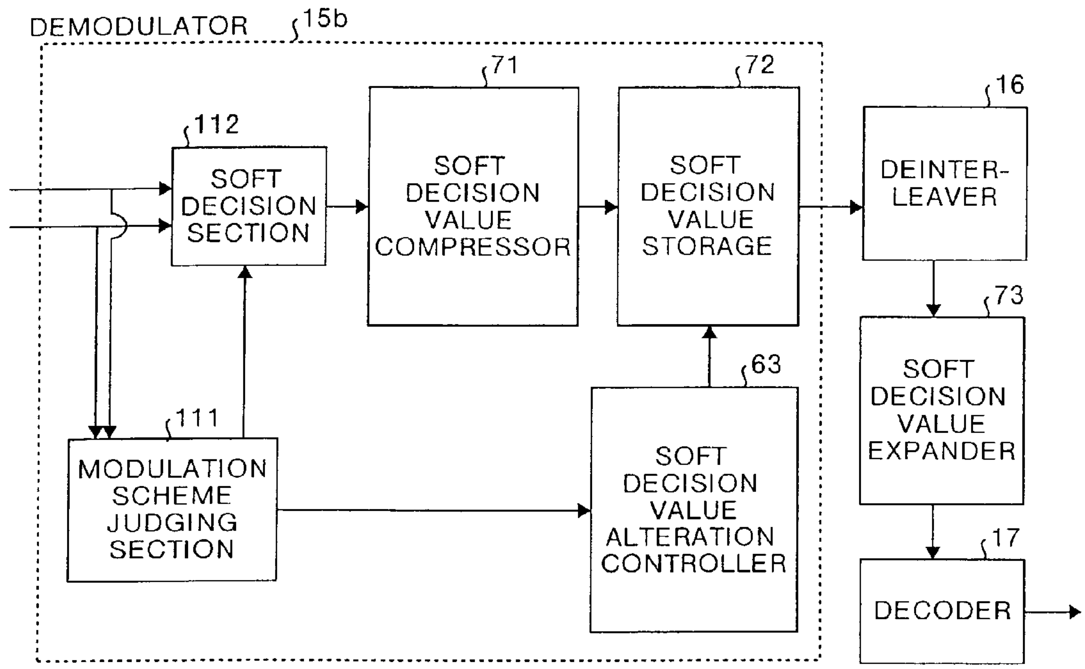
FIG. 12 is a diagram which shows a configuration of a receiver according to a third embodiment of the present invention.

FIG. 12 is a diagram which shows a configuration of a receiver according to a third embodiment of the present invention. In FIG. 12, the component indicated by the reference code 15*b* is a demodulator, the component indicated by the reference code 111 is a modulation scheme judging section, and 112 is a soft decision section. The demodulator 15*b* receives two lines of received signals in a diversity reception. It should be noted here that an instance when two lines of signals are received is explained, but this is not limiting. For example, it is possible to receive three or more lines of signals. Further, a variation of the second embodiment will be explained, however, the modulation scheme judging section 111 and the soft decision section 112 are also applicable as a variation of the first embodiment. Components identical with those in the first embodiment and the second embodiment are indicated by the same reference codes and will not be described here.

The modulation scheme judging section 111 judges the modulation scheme for each burst, based on correlation with the known sequence 41 contained in the two lines of received signals. The soft decision section 112 performs a soft decision in accordance with the modulation scheme so judged by the judgment. The soft decision section 112 uses a known technology, i.e. synchronization detection is made on the two lines of the received signals and their sum is calculated to obtain a soft decision value. Further, if there is interference between codes due to multiple paths and the like, another known soft decision output equalizer, in which a soft decision value is estimated by using the two lines of received signals is used.

Figure 13:
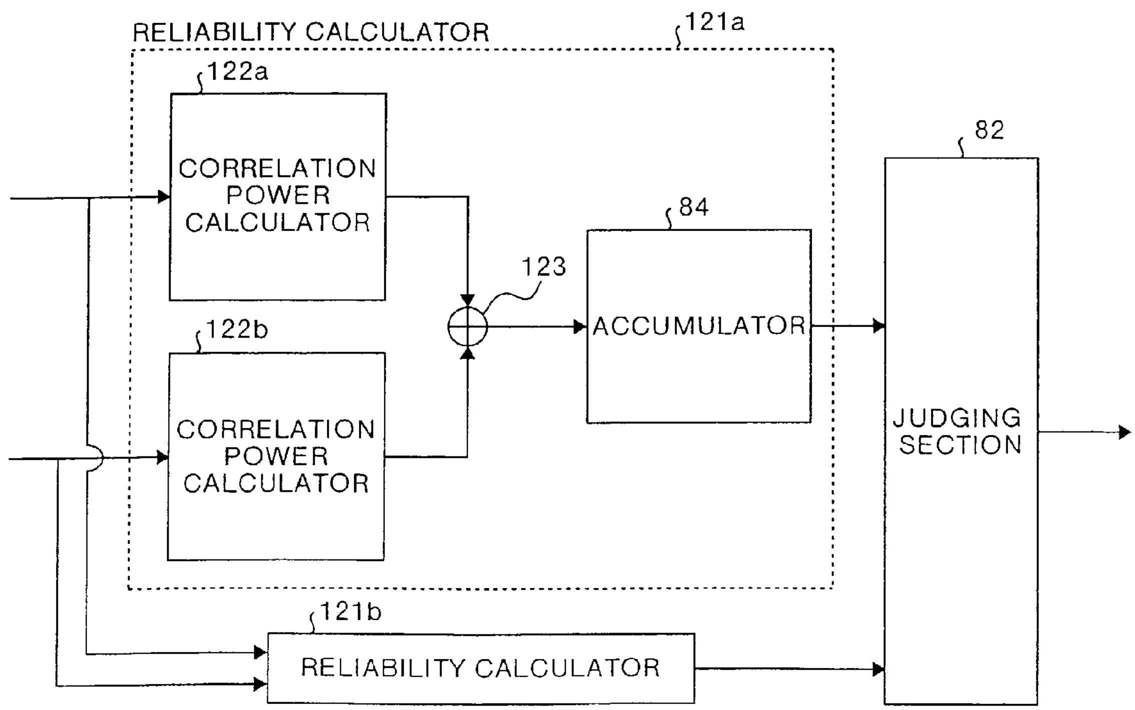
FIG. 13 is a diagram which shows a configuration example of the modulation scheme judging section.

FIG. 13 is a diagram which shows a configuration of the modulation scheme judging section 111. In FIG. 13, components indicated by reference codes 121*a* and 121*b* are reliability calculators. Components indicated by reference codes 122*a* and 122*b* are correlation power calculators, and the component indicated by the reference code 123 is an adder. Components identical with those in FIG. 7, FIG. 8 or in FIG. 9 are indicated by the same reference codes and will not be described here.

In the reliability calculator 121*a*, the correlation power calculators 122*a* and 122*b* calculate correlations respectively with a portion corresponding to the known sequence 41 of the received signal and with a known sequence corresponding to BPSK. The adder 123 adds the correlation powers output from the correlation power calculators 122*a* and 122*b*, and outputs a result to the accumulator 84, as a combined correlation power.

Figure 14:
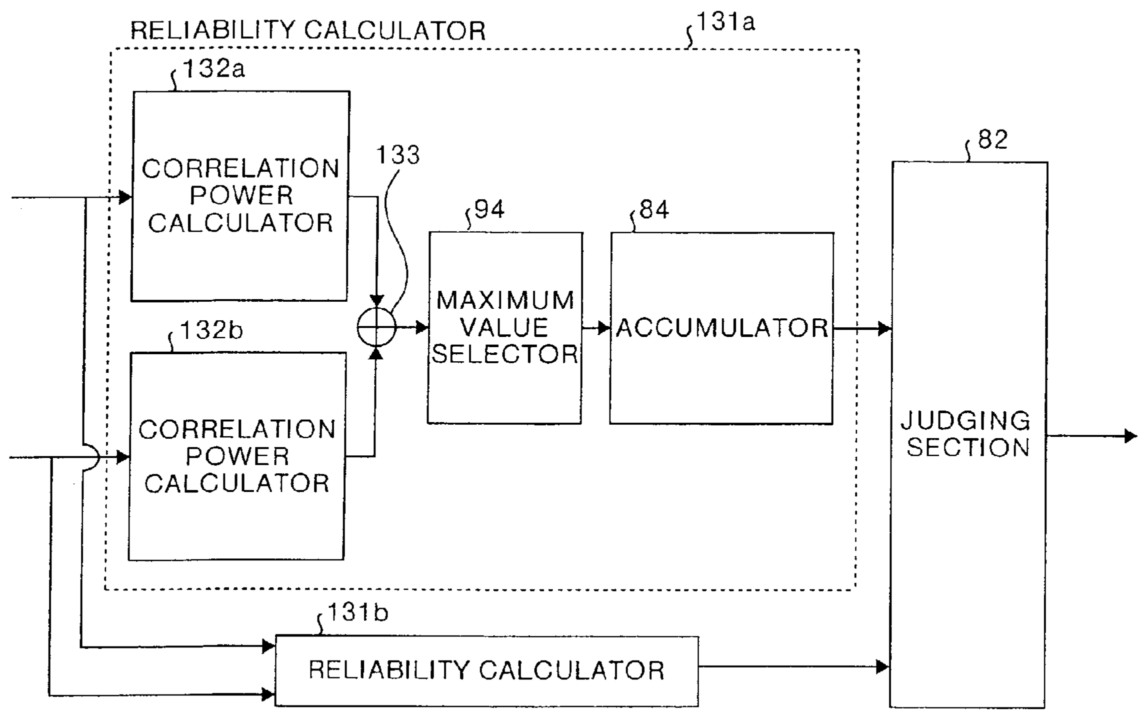
FIG. 14 is a diagram which shows a configuration example of the modulation scheme judging section.

FIG. 14 is a diagram which shows another configuration of the modulation scheme judging section 111 that is different from the one shown in FIG. 13. In FIG. 14, components indicated by reference codes 131*a* and 131*b* are reliability calculators. Components indicated by reference codes 132*a* and 132*b* are correlation power calculators, and the component indicated by the reference code 133 is an adder. Components identical with those in FIG. 7, FIG. 8 or in FIG. 9 are indicated by the same reference codes and will not be described here.

In the reliability calculator 131*a*, the correlation power calculators 132*a* and 132*b* calculate correlation power candidates Qaa(k) and Qab(k) respectively with a portion corresponding to the known sequence 41 of the received signal and with a known sequence I(i)corresponding to BPSK (i=0, . . . , N−1, k=−M, . . ., 0, . . . , M) of the relevant received signals. The letter N represents a length of the known sequence, whereas M represents a single-side range of detectable symbol timing.

$$Qaa(k)=|\Sigma ra(i+k)\times \mathrm{CONJG}[I(i)]|^2 \quad (6)$$

$$Qab(k)=|\Sigma rb(i+k)\times \mathrm{CONJG}[I(i)]|^2 \quad (7)$$

where, ra(n) and rb(n) represent the two lines of received signals, Qaa(k) represents correlation power candidates between the received signal ra(n) and a known sequence when the shift is made by as much as k symbols, Qab(k) represents correlation power candidates between the received signal rb(n) and the known sequence when the shift is made by as much as k symbols, and Σ calculates a total sum of i=0, . . . , N−1. The term CONJG[a] represents a conjugate complex number of a complex number a.

The adder 133 adds the correlation power candidates output by the correlation power calculators 132*a* and 132*b*, and outputs the result of the addition, i.e. a correlation power candidate Qa(k) to the maximum value selector 94 (k=−M, . . . , 0, . . . , M).

$$Qa(k)=Qaa(k)+Qab(k) \quad (8)$$

Figure 15:
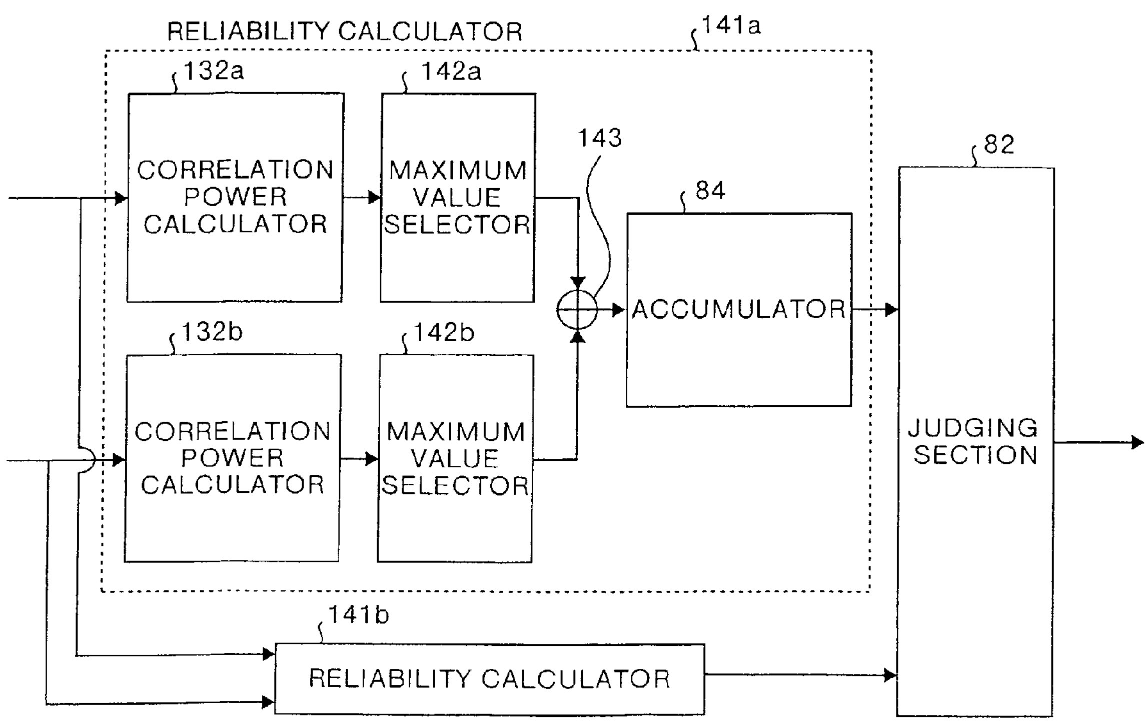
FIG. 15 is a diagram which shows a configuration example of the modulation scheme judging section.

FIG. 15 is a diagram which shows another configuration of the modulation scheme judging section 111 differing from those in FIG. 13 and in FIG. 14. In FIG. 15, components indicated by reference codes 141*a* and 141*b* are reliability calculators. Components indicated by reference codes 142*a* and 142*b* are maximum value selectors, and the component indicated by the reference code 143 is an adder. Components identical with those in FIG. 14 are indicated by the same reference codes and will not be described here.

In the reliability calculator 141*a*, the maximum value selectors 142*a* and 142*b* respectively select maximum values of the correlation power candidates Qaa(k) and Qab(k) output by the correlation power calculators 132*a* and 132*b*, and output the results to the adder 143 as the correlation power (k=−M, . . . , 0, . . . , M).

The adder 143 adds the correlation powers output by the maximum value selectors 142*a* and 142*b*, and outputs the result to the accumulator 84.

As described above, according to the third embodiment, the same advantages as in the first and second embodiments are obtained. Further, due to a diversity reception capability and a configuration in which a plural lines of received signals are used as a basis of soft decision and modulation scheme judgment, it is possible to achieve a higher quality in the communications than before.

As has been described, according to the present invention, it is configured such that a modulation scheme is judged for each burst, and a soft decision is made on the basis of the judgment result. Therefore, it is no longer necessary to store the received signal in all of the bursts contained in the coded block. This provides an advantage of reducing a memory size as well as reducing a circuit size of the entire receiver. Further, even if there is a misjudgment on the modulation scheme of a part of the bursts within the same coded block (a period in which modulation scheme is not changed), the false soft decision value is now correctable. This provides an advantage of enabling to decode the coded block correctly at any time, making possible to achieve a higher quality in the communication than before.

According to the next invention, further, it is configured such that a soft decision value is stored in a compressed form. This provides an advantage that a memory size can be reduced further remarkably.

According to the next invention, it is configured such that reliabilities for the bursts included in the same coded block are accumulated, and the modulation scheme is judged on the basis of this accumulated value. This provides an advantage that the modulation scheme can be judged more accurately than before. Further, it is configured such that a deinterleaving unit and a decoding unit perform a deinterleaving process and a decoding process respectively on the basis of the modulation scheme as judged as above. This provides an advantage of enabling to reduce probability of performing an unmatched deinterleaving process or an unmatched decoding process.

According to the next invention, it is configured such that correlation power candidates are calculated while shifting the timing of the received signal, and from these correlation power candidates, a maximum value is selected, and the accumulated value for the selected result is taken as reliability. This provides an advantage that even when the timing of the received signal is not known, and when there is interference between codes due to multiple paths and the like, it is still possible to judge the modulation scheme accurately.

According to the next invention, it is configured such that the correlation power is calculated after the phase of the received signal is rotated in reverse. This provides an advantage that even if the modulation scheme includes phase shift, it is still possible to judge the modulation scheme accurately. Another advantage is that since it is no longer necessary to include the rotation process by phase shifting, configuration of the correlation power calculation unit can be simplified.

According to the next invention, further, a diversity reception capability is provided as well as a configuration in which a plural lines of received signals are used as a basis of soft decision and modulation scheme judgment. This provides an advantage that a higher quality can be achieved in the communication than before.

According to the next invention, further, a diversity reception capability is provided, and reliabilities for the bursts included in the same coded block are accumulated, and the modulation scheme is judged on the basis of this accumulated value. This provides an advantage of that the modulation scheme can be judged even more accurately.

According to the next invention, further, it is configured such that a diversity reception capability is provided, and correlation power candidates are calculated while shifting the timing of the received signal, and from these correlation power candidates, a maximum value is selected, and the accumulated value for the selected result is taken as a reliability. This provides an advantage that even when the timing of the received signal is not known, and when there is interference between codes due to multiple paths, it is still possible to find the modulation scheme even more accurately.

According to the next invention, further, it is configured such that a diversity reception capability is provided, and correlation power candidates are calculated while shifting the timing of the received signal, and from these correlation power candidates, a maximum value is selected, and the accumulated value for the selected result is taken as a reliability. This provides an advantage that even when the timing of the received signal is not known, and when there is interference between codes due to multiple paths, it is still possible to judge the modulation scheme even more accurately.

INDUSTRIAL APPLICABILITY

As has been described, a receiver according to the present invention is suitable in the field of wireless communications such as automobile phones, portable phones, cordless phones and so on, and is beneficial in judging the modulation scheme for each burst, and correcting a false soft decision value if there is a wrong judgement on the modulation scheme in part of the bursts within a coded block.

The invention claimed is:

1. A receiver configured to receive a signal that has been encoded, interleaved, burst mapping processed, and modulated via a wireless channel, the receiver comprising:

- a modulation scheme judging unit configured to judge a modulation scheme for a burst based on a part of known sequence in the burst;
- a soft decision unit configured to receive the judged modulation scheme from the modulation scheme judging unit and the burst, and to output a soft decision value for the burst based on the judged modulation scheme and the burst;
- a soft decision value alteration controlling unit configured to receive the judged modulation scheme from the modulation scheme judging unit, and to control a change of the soft decision value if the judged modulation scheme is determined to be incorrect;
- a soft decision value storing and correcting unit configured to store the soft decision value output by the soft decision unit, and to change the soft decision value under the control of instructions output by the soft decision value alteration controlling unit;
- a deinterleaving unit configured to deinterleave the stored soft decision value; and
- a decoding unit configured to decode the soft decision value as after the deinterleaving.

2. The receiver according to claim 1, wherein the modulation scheme judging comprises:

- a plurality of correlation power calculating units each configured to calculate a correlation power between the part of known sequence in the burst and a known sequence corresponding to one of a plurality of modulation schemes;
- an accumulating unit, corresponding individually to each of the correlation power calculating units, configured to accumulate correlation powers and to output a result of the accumulation as a reliability for the corresponding modulation scheme; and
- a judging unit configured to compare reliabilities corresponding to respective modulation schemes and to select a most reliable modulation scheme as the modulation scheme of the received signal.

3. The receiver according to claim 1, wherein the modulation scheme judging unit comprises:

- a plurality of correlation power calculating units each configured to calculate, at a different timing, correlation power candidates between the part of known sequence in the burst and a known sequence corresponding to one of a plurality of modulation schemes;
- a maximum value selecting unit, corresponding individually to the correlation power calculating units, configured to select a maximum values from the obtained correlation power candidates, as a correlation power;
- an accumulating unit, corresponding individually to each of the maximum value selecting units, configured to accumulate correlation powers and to output a result of the accumulation as a reliability for the corresponding modulation scheme; and
- a judging unit configured to compare reliabilities corresponding to respective modulation schemes and to select a most reliable modulation scheme as the modulation scheme of the received signal.

4. The receiver according to claim 3, wherein the modulation scheme judging unit further comprises:

- a reverse rotation unit, provided ahead of the correlation power calculating units, configured to rotate in reverse direction a phase of the received signal by an amount corresponding to a relevant one of the modulation schemes.

5. The receiver according to claim 1, wherein:

- the modulation scheme judging unit is configured to judge the modulation scheme for the burst based on a plurality of received signals each including a signal portion corresponding to the burst; and
- the soft decision unit is configured to calculate the soft decision value based on the judged modulation scheme and the received signals.

6. The receiver according to claim 5, wherein the modulation scheme judging unit comprises:

- a plurality of correlation power calculating units each configured to calculate, for each of the modulation schemes, a correlation power between a apart of known sequence in one of the signal portions of the received signals and a known sequence corresponding to a specific modulation scheme;
- a correlation power combining unit configured to calculate, for each of the modulation schemes, a sum of correlation powers of the signal portions;
- an accumulating unit, corresponding individually to each of the correlation power combining units, configured to accumulate sums of correlation powers and to output a result of the accumulation as a reliability for the corresponding modulation scheme; and
- a judging unit configured to compare reliabilities corresponding to respective modulation schemes and to select a most reliable modulation scheme as the modulation scheme of the received signal.

7. A receiver configured to receive a signal that has been encoded, interleaved, burst mapping processed, and modulated via a wireless channel, the receiver comprising,

- a modulation scheme judging unit configured to judge a modulation scheme for a burst based on a part of known sequence in the burst;
- a soft decision unit configured to receive the judged modulation scheme from the modulation scheme judging unit and the burst, and to output a soft decision value for the burst based on the judged modulation scheme and the burst;

a soft decision compressed-value alteration controlling unit configured to receive the judged modulation scheme from the modulation scheme judging unit, and to control a change of a soft decision compressed-value if the judged modulation scheme is determined to be incorrect;

a soft decision value compressing unit configured to compress the number of bits of the soft decision value and output the soft decision compressed-value;

a soft decision compressed-value storing and correcting unit configured to store the soft decision compressed-value, and to change the soft decision compressed-value under the control of instructions output by the soft decision compressed-value alteration controlling unit;

a deinterleaving unit configured to deinterleave the stored soft decision compressed-value;

a soft decision compressed-value expanding unit configured to expand the soft decision compressed-value, as after the deinterleaving, to generate the soft decision value; and a decoding unit configured to decode the soft decision value.

8. The receiver according to claim 7, wherein the modulation scheme judging unit comprises:

a plurality of correlation power calculating units each configured to calculate a correlation power between the part of known sequence in the burst and a known sequence corresponding to one of a plurality of modulation schemes;

an accumulating unit, corresponding individually to each of the correlation power calculating units, configured to accumulate correlation powers and to output a result of the accumulation as a reliability for the corresponding modulation scheme; and a judging unit configured to compare reliabilities corresponding to respective modulation schemes and to select a most reliable modulation scheme as the modulation scheme of the received signal.

9. The receiver according to claim 7, wherein the modulation scheme judging unit comprises:

a plurality of correlation power calculating units each configured to calculate, at a different timing, correlation power candidates between the part of known sequence in the burst and a known sequence corresponding to one of a plurality of modulation schemes;

a maximum value, corresponding individually to the correlation power calculating units, configured to select a maximum value, from the obtained correlation power candidates, as a correlation power;

an accumulating unit, corresponding individually to each of the maximum value selecting units, configured to accumulate correlation powers and to output a result of the accumulation as a reliability for the corresponding modulation scheme; and a judging unit configured to compare reliabilities corresponding to respective modulation schemes and to select a most reliable modulation scheme as the modulation scheme of the received signal.

10. The receiver according to claim 9, wherein the modulation scheme judging unit further comprises:

a reverse rotation unit, provided ahead of the correlation power calculating units, configured to rotate in reverse direction a phase of the received signal by an amount corresponding to a relevant one of the modulation schemes.

11. The receiver according to claim 7, wherein:

the modulation scheme judging unit is configured to judge the modulation scheme for the burst based on a plurality of received signals each including a signal portion corresponding to the burst; and the soft decision unit is configured to calculate the soft decision value based on the judged modulation scheme and the received signals.

12. The receiver according to claim 11, wherein the modulation scheme judging unit comprises:

a plurality of correlation power calculating units each configured to calculate, for each of the modulation schemes, a correlation power between a part of known sequence in one of the signal portions and a known sequence corresponding to a specific modulation scheme;

a correlation power combining unit configured to calculate, for each of the modulation schemes, a sum of correlation powers of the signal portions;

an accumulating unit, corresponding individually to each of the correlation power combining units, configured to accumulate sums of correlation powers and to output a result of the accumulation as a reliability for the corresponding modulation scheme; and a judging unit configured to compare reliabilities corresponding to respective modulation schemes and to select a most reliable modulation scheme as the modulation scheme of the received signal.

* * * * *